J. T. PARKER.
APPARATUS FOR SUBMARINE PHOTOGRAPHY.
APPLICATION FILED DEC. 5, 1914.

1,149,678.

Patented Aug. 10, 1915.

Witnesses

Joseph Thompson Parker. Inventor

By

Attorney

UNITED STATES PATENT OFFICE.

JOSEPH THOMPSON PARKER, OF WASHINGTON, DISTRICT OF COLUMBIA.

APPARATUS FOR SUBMARINE PHOTOGRAPHY.

1,149,678. Specification of Letters Patent. Patented Aug. 10, 1915.

Application filed December 5, 1914. Serial No. 875,735.

*To all whom it may concern:*

Be it known that I, JOSEPH THOMPSON PARKER, a citizen of the United States, residing at Washington, District of Columbia, have invented certain new and useful Improvements in Apparatus for Submarine Photography, of which the following is a specification.

My invention relates to apparatus for submarine photography.

The object of the invention is to provide means whereby motion pictures may be taken of the bottom of bodies of water from an ordinary boat.

Further objects and advantages will be more fully described herein and specifically pointed out in the annexed claims, recourse being had to the accompanying drawing forming a part of this specification in which:—

Figure 1:
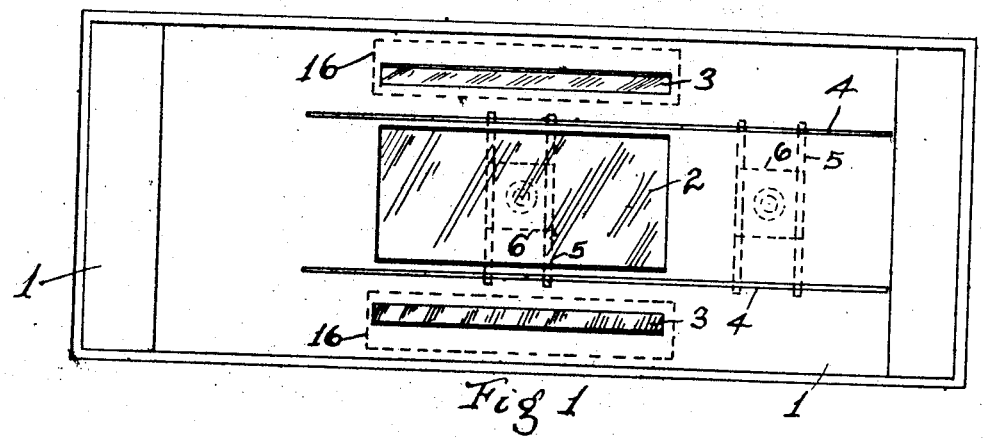
Figure 3:
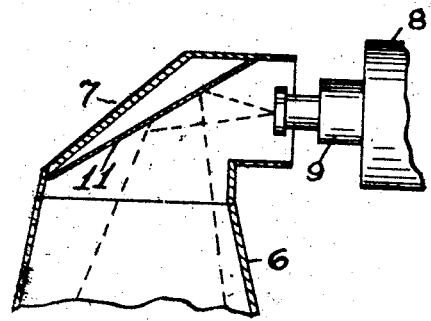
Figure 4:
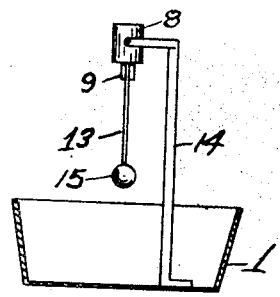
Figure 2:
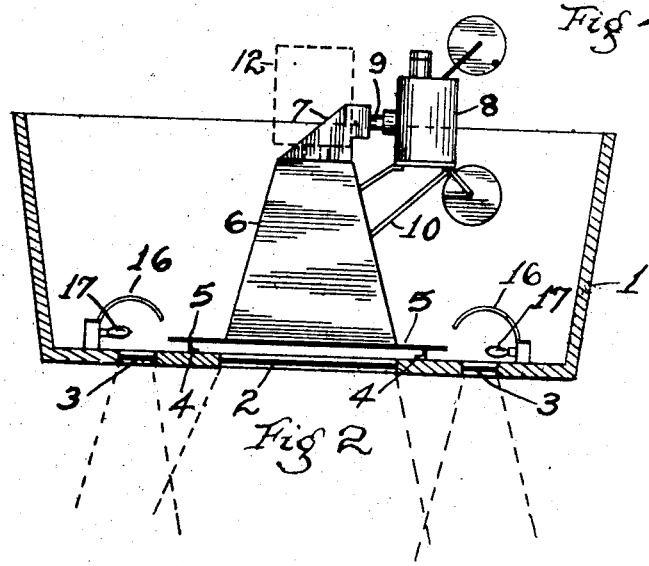

Figure 1 is a plan of a boat showing the glass plates in the bottom thereof. Fig. 2 is a cross section of the same showing the photographic motion picture devices. Fig. 3 is a section of the upper portion of the dark chamber or box and its reflecting mirror, and Fig. 4 is a cross section of the boat showing a device for keeping the camera perpendicular when the boat rolls or rocks.

1 is the boat and is provided with a glass plate occupying a portion of the bottom of the same, as shown at 2.

3 are narrow glass plates placed alongside of the wide glass plate 2 and are for the purpose of allowing light to be reflected downward into the water.

4 are tracks along the length of the boat bottom forming slideways for the support bars 5 of the dark chamber or box 6, the latter is provided with a reflecting chamber 7, as shown.

8 is a motion picture photographic camera having a lens or lens box 9 adapted to be inserted in the portion 7 of the dark chamber 6. The camera 8 is attached to the dark chamber or box by the brackets 10, or other suitable means.

The objects in the water or the bed of the same are reflected by means of the inclined mirror 11 within the part 7 so that the camera may take pictures indirectly, or I may arrange the camera to take pictures directly by placing the same so as to point downward, as shown by the dotted lines 12 in Fig. 2.

I may also arrange a pendulum 13 and its weight 15 pivotally supporting the camera by the arm or bracket 14, so that it may remain vertical or perpendicular during the rocking of the boat in rough water.

16 are reflectors for the lamps 17 so that light may be thrown downward through the glass plates 3 for illuminating the water space underneath the boat for taking pictures of objects under the surface or on the bed thereof.

By my invention I am enabled to construct means for sub-marine photography cheaply and without the use of expensive apparatus.

It will be observed that a feature of importance lies in the fact that the camera apparatus may be moved bodily along the bottom of the boat for the purpose of properly positioning it with reference to the object or objects being photographed.

I claim:

In an apparatus of the class set forth, the combination of a glass-bottom boat provided with rails along the bottom at the sides of the glass, a dark chamber mounted to slide on said rails, and a camera mounted on said dark chamber.

In testimony whereof I have hereunto affixed my signature in the presence of two witnesses.

JOSEPH THOMPSON PARKER.

Witnesses:
WALTER B. BURROW,
J. M. ROBERTS.